(12) United States Patent
Döhring et al.

(10) Patent No.: US 8,505,255 B2
(45) Date of Patent: Aug. 13, 2013

(54) LAMINATE FLOORING WITH FOOTSTEP SOUND ABSORPTION

(75) Inventors: Dieter Döhring, Lampertswalde (DE); Bernd Devantier, Dresden (DE); Rico Emmler, Dresden (DE)

(73) Assignee: Kronoplus Technical AG, Niederteufen (CH)

( * ) Notice: Subject to any disclaimer, the term of this patent is extended or adjusted under 35 U.S.C. 154(b) by 1342 days.

(21) Appl. No.: 10/925,568

(22) Filed: Aug. 25, 2004

(65) Prior Publication Data
US 2005/0188639 A1    Sep. 1, 2005

Related U.S. Application Data

(63) Continuation of application No. 10/031,186, filed on Jun. 3, 2002, now abandoned.

(30) Foreign Application Priority Data

Jul. 31, 1999 (DE) .................................. 199 36 127

(51) Int. Cl.
*E04F 15/22* (2006.01)

(52) U.S. Cl.
USPC .......................................... 52/403.1; 52/408

(58) Field of Classification Search
USPC ................. 52/403.1, 408, 384, 389; 428/215
See application file for complete search history.

(56) References Cited

U.S. PATENT DOCUMENTS

| | | | |
|---|---|---|---|
| 3,729,368 A | 4/1973 | Ingham et al. | |
| 4,865,912 A | 9/1989 | Mitsumata | |
| 5,176,833 A | 1/1993 | Vaughn et al. | |
| 5,205,091 A * | 4/1993 | Brown | 52/126.6 |
| 5,326,629 A | 7/1994 | Vaughn et al. | |
| 5,407,617 A | 4/1995 | Oppermann et al. | |
| 5,409,564 A | 4/1995 | Aaldijk | |
| 5,425,908 A * | 6/1995 | Merser | 264/46.4 |
| 5,543,193 A | 8/1996 | Tesch | |
| 5,571,588 A | 11/1996 | Lussi et al. | |
| 5,928,735 A | 7/1999 | Padmanabhan et al. | |
| 5,948,500 A | 9/1999 | Higgins | |

(Continued)

FOREIGN PATENT DOCUMENTS

| | | |
|---|---|---|
| DE | 27 19 361 | 11/1978 |
| DE | 86 18 554 | 10/1986 |

(Continued)

OTHER PUBLICATIONS

"Konstruieren mit Kunststoffen," part 1, pp. 416-418 and 639-651, G. Schreyer, Carl Hanser Verlag, Munich 1972.

(Continued)

*Primary Examiner* — Basil Katcheves

(74) *Attorney, Agent, or Firm* — Renner, Otto, Boisselle & Sklar, LLP

(57) ABSTRACT

The invention relates to a floor covering as is frequently used in houses and apartments. The floor covering has on its underside a layer of thermoplastic material. This layer is connected in a fixed manner to the floor covering. The floor covering consists of wood, wood derivatives and/or synthetic materials. In order to produced said floor covering, the thermoplastic material is heated and applied, or rolled onto the underside of the floor covering. The latter exhibits excellent soundproofing properties.

17 Claims, 1 Drawing Sheet

(56) References Cited

U.S. PATENT DOCUMENTS

| | | | |
|---|---|---|---|
| 5,968,625 A * | 10/1999 | Hudson | 428/54 |
| 6,365,258 B1 | 4/2002 | Alm | |
| 6,428,873 B1 | 8/2002 | Kerr | |
| 6,468,629 B1 * | 10/2002 | Lodder | 428/158 |
| 6,531,207 B1 | 3/2003 | Eaton et al. | |
| 6,558,765 B2 | 5/2003 | Padmanabhan | |
| 6,558,766 B2 | 5/2003 | Padmanabhan et al. | |
| 6,576,577 B1 | 6/2003 | Garner | |
| 6,607,803 B2 | 8/2003 | Foster | |
| 6,652,955 B1 | 11/2003 | Plug | |
| 6,818,286 B2 * | 11/2004 | Dohring | 428/215 |
| 2003/0066708 A1 | 4/2003 | Allison et al. | |
| 2003/0077433 A1 | 4/2003 | Dohring | |
| 2003/0096079 A1 | 5/2003 | Messina et al. | |

FOREIGN PATENT DOCUMENTS

| | | |
|---|---|---|
| DE | 37 15 646 | 11/1988 |
| EP | 0 105 074 | 4/1988 |
| EP | 0 396 891 | 12/1995 |
| EP | 0 864 712 | 9/1998 |
| EP | 1 200 692 | 11/2009 |
| FR | 2 359 253 | 2/1978 |
| GB | 2 024 907 A | 1/1980 |
| GB | 2 085 357 | 4/1982 |
| JP | 64-43133 | 3/1989 |
| JP | 0 203 0848 | 1/1990 |
| WO | 93/24295 A | 12/1993 |

OTHER PUBLICATIONS

"Kunststoff Handbuch," vol. IV—Polyolefins, pp. 339-346, R. Vieweg, A. Schley and A. Schwarz, Carl Hanser, Muncih 1969.

Holz-Lexikon—Nachschlagewerk fur die Holz—und Forstwirtschaft, 1962, pp. cover, 239-240.

Fachzeitschrift, HK Holz—und Mobelindustrie, Apr. 1994, pp. cover, 443-445.

Fachzeitschrift, HK Holz—und Kunststoffverarbeitung, Jul.-Aug. 1995, pp., cover, 974-988.

Nitsche and Wolfe, Chemie, Physik und Technologie der Kunststoffe, 1962, pp. cover, 341, 363-365, 426.

Fachbuch, Chemie und Technologie der Kunststoffe, pp. 742-743.

Ergebnis einer von O-II Durchgetuhrten Internet-Recherche.

Fachbuch, Chemie und Technologie der Kunststoffe, pp. 634-639.

Kopie des Einspruch Schriftsatzes zu (Copy of Notice of Opposition for) EP-1247923-B1.

Handbuch, Holzwerkstoffe—Herstellung und Verarbeitung—Platten, Beschichtungsstoffe, Formteile, Turen, Mobel, Hansgert Soigne DRW Verlag, 1995, p. 231.

Strapaziert und Bewertet aus der Zeitschrift Stiftung Warentest, May 2005, pp. 66-71.

* cited by examiner

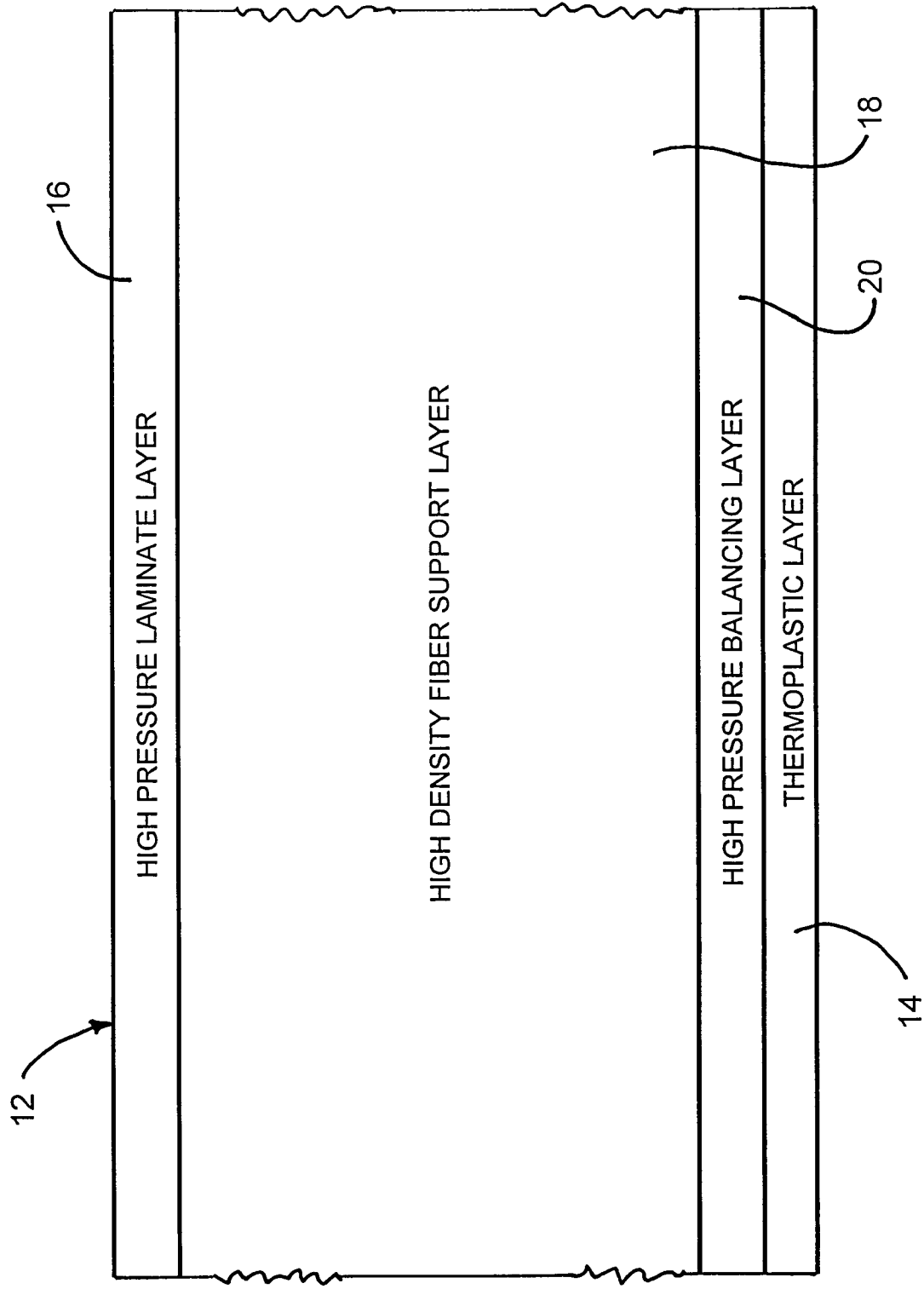

LAMINATE FLOORING WITH FOOTSTEP SOUND ABSORPTION

This application is a continuation of U.S. patent application Ser. No. 10/031,186 filed Jun. 3, 2002, now abandoned which is hereby incorporated herein by reference in its entirety. The invention relates to a floor covering, as widely used in houses and apartments, and to a process for the production of the floor covering.

A rigid floor covering can consist of wood, timber-based materials and/or plastics. Among other things, laminate floors are known which are composed of individual panels and are laid as a floating floor. A single panel consists e.g. of an HDF support sheet and a laminate layer applied thereon, which is responsible for the appearance of the floor, among other things.

BACKGROUND OF THE INVENTION

If people move about in a room fitted with rigid floor panels, the noise development is clearly greater than in rooms fitted with carpets or elastic floor coverings such as PVC. The noise development is based on reflections of shock waves introduced into the floor when it is walked on. The amplitude spectrum of the shock or sound waves depends on the room-floor, floor-substrate boundaries and on the attenuation in the different layers. The noise development is particularly high if a layer of air remains between two layers, i.e. for example between the laminate floor and the screed below it.

In order to reduce the noise development from walking, various mat-like materials, such as closed-cell polyethylene foam, cork, polymer-bonded mats of recycled rubber and cork, corrugated card or soft wood-fibre fabrics are used as an underlay under a rigid floor covering above the screed. The sound-absorbing effect that can be achieved by this method is unsatisfactory, however.

Attempts have therefore already been made to stick the above mat-like materials directly to the back of a rigid floor covering, i.e. on the base of a floor panel, for example. Disadvantageously, this involves high technical complexity. The costs are consequently high. Overall, the sound reduction is unsatisfactory in relation to the technical complexity.

From the document DE 196 20 987 C1, for example, an insulating film is known, which is equipped with an adhesive strip. It is intended to stick the insulating film on to the bottom of a rigid floor covering so as to reduce noise development when the floor is walked on.

From the document DE 43 29 766 A1, it is known to provide a polymer material for the footstep sound insulation of a floor.

According to the document DE 38 35 638 A1 an insulating material made of expandable polystyrene is used as an insulating layer in rigid floor coverings.

SUMMARY AND DETAILED DESCRIPTION OF THE INVENTION

Compared with the prior art, the object of the invention is to create a floor covering having good sound-absorbing properties, without having to deal with unreasonably high technical complexity for the purpose. A further object of the invention is to create a process by which the floor covering according to the invention can be produced by simple means.

The object of the invention is achieved by a floor covering having the features of the first claim. A process for the production of the floor covering has the features of the first coordinated claim. Advantageous embodiments can be taken from the subordinate claims.

The floor covering according to claim 1 has on the bottom a layer of thermoplastic material. The layer is firmly bonded to the floor covering. The floor covering consists of wood, timber-based materials and/or plastics.

Thermoplastic material is one that softens and becomes free-flowing when a material-dependent temperature is exceeded. In this state, the material is deformable and can be applied to the bottom of the floor covering by spreading or roller application and thus firmly bonded to the floor covering within the meaning of the invention.

If the temperature falls below that mentioned above, the material solidifies and the plastic/elastic properties become evident.

The above properties of the thermoplastic material allow it to be firmly bonded to the bottom of the rigid floor covering by spreading or roller application at elevated temperatures. As a result of the firm bond, the sound waves are transferred directly into the sound-absorbing layer without reflection at the boundary layer. Thus, a significant cause of a lack of sound absorption, which is a problem in floors according to the prior art mentioned at the beginning, is removed, resulting in substantially improved sound absorption.

Since the material only has to be heated and spread or rolled on, the production is simple. It is not therefore necessary to deal with high technical complexity.

The invention can, in principle, be applied to any floor covering. However, the problem according to the invention arises in particular with rigid floor coverings, such as laminate or parquet. A rigid floor covering generally consists of wood, timber-based materials and/or plastics.

A thickness of the sound-absorbing layer of at least 0.1 mm has proved useful. With a 5 mm thickness of the sound-absorbing layer consisting of thermoplastic material the amount of material required is in an economic ratio to the effect that can be achieved. In tests, a thickness of 0.7 mm has proved advantageous.

The most suitable layer thickness naturally depends on the material. It therefore varies in each individual case.

Polymers or copolymers in particular are provided as the thermoplastic material. Those polymers or copolymers displaying a marked physical relaxation behaviour in the ambient temperature range are to be preferred. Examples of thermoplastic polymers with marked physical relaxation behaviour in the ambient temperature range are polyvinyl propionate or polyvinyl acetate. On the other hand polycarbonate, for example, with its high glass transition temperature, is a completely unsuitable material. In terms of metrology, suitable materials display a distinct maximum e.g. when the torsion modulus is presented as a function of the temperature in the loss modulus tan δ in the ambient temperature range or immediately adjacent temperature ranges. The physical bases, including examples of curves, are contained in polymer physics text books, such as e.g.: Chemie, Physik und Technologie der Kunststoffe vol. 6, Kunststoffe 1—Struktur und physikalisches Verhalten der Kunststoffe—, chapter 4; K. A. Wolf, Springer-Verlag 1962.

If the material displays a marked physical relaxation behaviour in the ambient temperature range, particularly good absorption is achieved since kinetic energy is converted to heat particularly well.

Examples of materials displaying particularly good relaxation behaviour at ambient temperature are:

Polyvinyl formals, polyvinyl butyrals, polyvinyl ethers, polyisobutenes or copolymers, such as e.g. terpolymers of acrylonitrile, butadiene and styrene (ABS), copolymers of vinyl chloride and 2-ethylhexyl acrylate, copolymers of vinyl acetate and vinyl laurate or polymer blends of these polymers, including with the addition of typical polymer plasticisers.

A further improved sound-absorbing effect is achieved by adding fillers, especially light organic fillers with a density of less than 1 g/cm³, such as e.g. wood flour, to polymers or copolymers. These fillers can be added in quantities of up to 90 wt. %. An addition of at least 10 wt. % is advantageous. In particular, 30 wt. % should be added.

In another advantageous embodiment of the invention, the thermoplastic material is selected such that it exhibits adhesive properties. Adhesion is a technical term typical of polymers. Thermoplastic rubbers are an example of a material exhibiting adhesive properties within the meaning of the invention.

If the material is selected such that it exhibits adhesive properties, it sticks to the floor substrate. The adhesion is preferably designed in such a way that the floor covering can be removed again without complex technical resources. An intermediate layer (air layer) between the floor-substrate and the thermoplastic layer is minimised in this way. Sound is therefore absorbed in a further improved manner.

The floor covering according to the claims is produced in that thermoplastic material is heated in such a way that it becomes free-flowing. The heated material is applied to the bottom of elements of the floor covering or on to a support sheet for such a floor covering by spreading or roller application. The floor elements or the support sheet are then cooled together with the applied thermoplastic material.

The invention is explained in more detail by means of the following embodiment and accompanying drawing which diagrammatically illustrates a floor covering 10 according to the invention. A floor panel 12 in a 1285×185×8 mm format is provided as the rigid floor covering. This consists of a 0.8 mm thick high pressure laminate layer 16, a 6.4 mm thick HDF support sheet 18 with a density of 870 kg/m' and a 0.8 mm thick high pressure laminate balancing layer 20. A thermoplastic layer 14 consisting of a copolymer is applied to the floor panel by means of spreading equipment on the back of the panel at a temperature of 150° C. The copolymer consists of vinyl acetate with an acrylate proportion of 12 wt. %. The thickness of the applied layer is 0.7 mm.

In an acoustic test chamber, the sound level was measured when a laid area of 20 m² of the floor produced according to the invention was walked on, compared with an untreated area. A closed-cell foam mat consisting of polyethylene in a thickness of 3 mm was laid under the untreated floor. The coated floor was laid without any additional insulating materials. In the result of the sound measurements, a sound level of 78 dB was detectable for the untreated floor in the measuring chamber and for the floor fitted with sound absorption according to the intention a sound level of 67 dB with the same mechanical stimulus. Since at the same time a frequency shift from higher to lower tones took place, the treated floor was perceived as substantially quieter.

What is claimed is:

1. A house or apartment sound-insulating floor covering component intended to cover a floor of a house or apartment, comprising:
    a rigid laminate or parquet panel including wood or timber-based materials, the panel having a bottom surface and a top appearance surface; and
    a layer of thermoplastic material firmly bonded to the bottom surface of the panel, which layer of thermoplastic material has adhesive properties such that the thermoplastic material of the floor covering will adhere onto the floor of the house or apartment in an installed condition and an air layer between the floor of the house or apartment and the thermoplastic layer will be minimized, and wherein the layer of thermoplastic material is 0.1 to 5 mm thick.

2. A sound-insulating floor covering component according to claim 1, wherein the layer of thermoplastic material displays a marked physical relaxation behavior at ambient temperature when subjected to shock waves introduced into the floor when walked on.

3. A sound-insulating floor covering component according to claim 2, wherein the panel further comprises a balancing layer.

4. A sound-insulating floor covering component according to claim 2, wherein the panel has a thickness of 8 mm.

5. A sound-insulating floor covering component according to claim 1, wherein the thermoplastic material is selected from the group consisting of polyvinyl formals, polyvinyl butyrals, polyvinyl ethers, polyisobutenes, copolymers including terpolymers of acrylonitrile, butadiene and styrene (ABS), copolymers of vinyl chloride and 2-ethylhexyl acrylate, copolymers of vinyl acetate and vinyl laurate, or blends of these polymers.

6. A sound-insulating floor covering component according to claim 1, wherein the thermoplastic material includes a filler.

7. A sound-insulating floor covering component according to claim 6, wherein the filler is a light organic substance.

8. A sound-insulating floor covering component according to claim 1, wherein thermoplastic material has an adhesive property for bonding to the bottom surface of the panel.

9. A sound-insulating floor covering component according to claim 1, wherein the panel is thicker than the layer of thermoplastic material.

10. A floor in a house or apartment comprising a plurality of floor covering components according to claim 1 assembled over a floor substrate with the layer of thermoplastic material adhering to the floor substrate.

11. A floor as set forth in claim 10, wherein the floor substrate includes a foam mat.

12. A floor as set forth in claim 10, wherein the floor covering components are assembled as a floating floor on the substrate.

13. A sound-insulating floor covering component according to claim 1, wherein the panel includes a high pressure laminate layer and a support layer thicker than the high pressure laminate layer.

14. A sound-insulating floor covering component according to claim 13, wherein the support layer is a high density fiber support sheet.

15. A house or apartment sound-insulating floor covering component comprising:
    a rigid laminate or parquet panel including wood or timber-based materials, the panel having a bottom surface and a top appearance surface; and
    a layer of thermoplastic material firmly bonded to the bottom surface of the panel by means of direct application to the bottom surface in a molten state and subsequent cooling to a solid state, which layer of thermoplastic material in its solid state has adhesive properties such that the thermoplastic material of the floor covering will adhere onto a floor of a house or apartment in an installed condition and an air layer between the floor of the house or apartment and the thermoplastic layer will be minimized.

16. A sound-insulating floor covering component according to claim 15, wherein the thermoplastic material was applied by spreading or roller application.

17. A sound-insulating floor covering component according to claim 15, wherein the thermoplastic material is selected from the group consisting of polyvinyl formals, polyvinyl butyrals, polyvinyl ethers, polyisobutenes, copolymers including terpolymers of acrylonitrile, butadiene and styrene (ABS), copolymers of vinyl chloride and 2-ethylhexyl acrylate, copolymers of vinyl acetate and vinyl laurate, or blends of these polymers, and wherein the thermoplastic material includes a plasticiser.

* * * * *